United States Patent [19]

Billiotte et al.

[11] Patent Number: 4,947,450

[45] Date of Patent: Aug. 7, 1990

[54] OPTICAL READING APPARATUS

[75] Inventors: Jean-Marie Billiotte, Noisy Le Grand; Thierry Bouin, Boutigny; Frédéric Basset; Jacques Beauvois, both of Paris, all of France; Didier Primat, Geneva, Switzerland

[73] Assignee: UP Systems, Montreuil, France

[21] Appl. No.: 93,679

[22] Filed: Sep. 8, 1987

[30] Foreign Application Priority Data

Sep. 17, 1986 [FR] France ................................. 86 12995

[51] Int. Cl.$^5$ ............................................. G06R 9/28
[52] U.S. Cl. ........................................ 382/68; 355/73; 358/106
[58] Field of Search ....................... 382/67, 68, , 65, 8; 358/285, 293, 199, 106, 107; 235/460, 452, 478, 461, 454; 250/566, 557, 556, 571, 234; 355/53, 73, 76

[56] References Cited

U.S. PATENT DOCUMENTS

| | | | |
|---|---|---|---|
| 3,644,039 | 2/1979 | Boyer | 355/73 |
| 4,292,672 | 9/1981 | Southgate | 358/106 |
| 4,441,808 | 4/1984 | Giacomelli | 355/73 |
| 4,549,206 | 10/1985 | Suzuki et al. | 358/106 |

Primary Examiner—Leo H. Boudreau
Attorney, Agent, or Firm—Sughrue, Mion, Zinn, Macpeak & Seas

[57] ABSTRACT

Apparatus for reading optically a scene made up of symbols on a transparent medium comprises a transparent flat plate on which the scene is supported. An illumination system on one side of this plate illuminates at least part of the scene. An optical reader device on the opposite side of the plate incorporates an optical sensor. A pneumatic skid is moved over the opposite side of the plate and has a recess in its surface facing the plate in which the sensor is accommodated. Thus the scene is scanned by the sensor as the skid is moved over the plate.

8 Claims, 1 Drawing Sheet

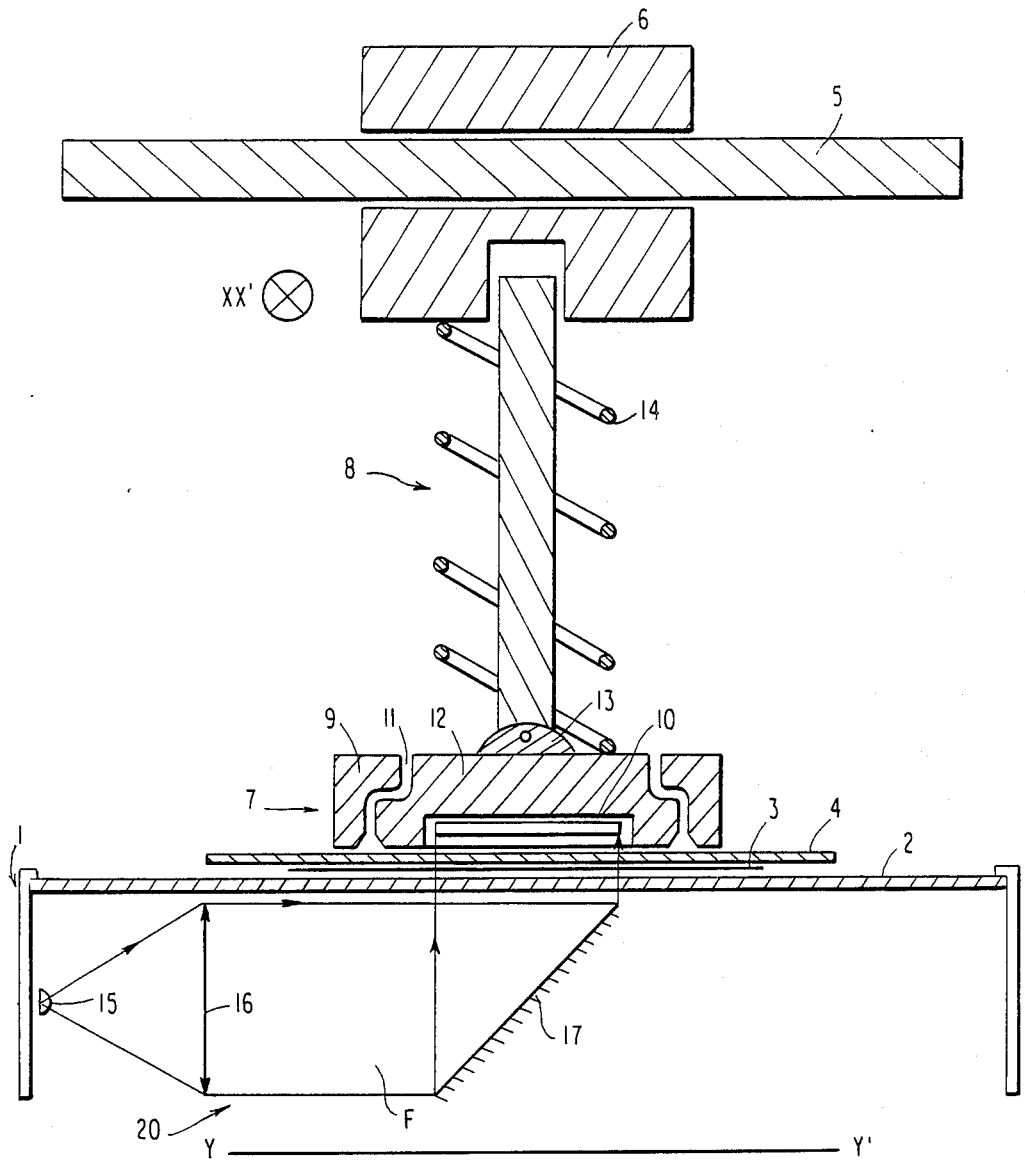
FIGURE

OPTICAL READING APPARATUS

BACKGROUND OF THE INVENTION

1. Field of the invention

The present invention concerns apparatus for reading optically a scene made up of a set of symbols of any kind on a transparent medium.

2. Description of the prior art

In numerous fields of activity it is necessary to process sets of graphical or other signs (texts, drawings, photographs, etc) that can be read from an opaque or transparent flat medium such as a sheet of paper or a plastics material film, for example. The processing to which these sets of signs are usually subjected in essentially directed to digitizing the image, to modifying their presentation and/or to deriving specific information from them.

In printing, for example, this type of processing is typically used for formatting text and illustrations during the process of designing books and newspapers. With regard to the latter, and with regard to daily newspapers in particular, the laying out of the pages imposes specific constraints in that it has to be done quickly and has to be modifiable virtually instantaneously to allow for newsworthy events occurring just before the paper is printed.

Another area in which this type of processing is routinely applied is the manufacture of printed circuits. Printed circuit boards are generally produced by chemical etching of exposed parts of a thin layer of copper bonded onto an insulative material and covered with a photo-sensitive film. The copper is exposed through a photographic mask consisting of a transparent film on which the conductive (or insulative) parts of the circuit to be manufactured are represented by opaque areas. If for any reason it is required to manufacture printed circuits featuring variations or modifications as compared with a printed circuit for which the mask is available, a new mask is produced from the original mask, which is therefore subjected to the kind of processing generally referred to above.

Until relatively recently, in order to modify or amend a document where the medium was a sheet of any material the work was done directly on the medium. At present, for reasons of speed and reliability, use is usually made of computer-controlled machines, the facilities of which include the possibility of working without any regard to the physical medium. As computers can process only digital data, the computer processing of a document is necessarily preceded by the digitization of the signs constituting it. This digitization is applied after the acquisition of said signs in the form of analog data by optical sensor devices.

At present two types of optical sensor device are mainly employed for acquiring signs readable on a flat medium. Hereinafter the term "scene" will be used to designate the combination consisting of the readable signs and their medium.

A first optical acquisition device which is suitable for reading documents on a flexible medium comprises a drum onto which the scene to be acquired is fixed, for example by means of a suction system producing a reduced pressure inside the drum. Parallel to the axis of the drum is a straight guide rail along which can move a laser beam emitter/ receiver. In operation the drum rotates at constant speed. The emitter/receiver moves at constant speed along the rail and the laser beam, the end of which describes on the drum a spiral with contiguous turns, is modulated by the signs on the sheet attached to the drum. This device has the disadvantage of being able to read only documents on a flexible medium and of having a relatively limited acquisition rate on the order of 400 kHz). It is not possible to increase the rotation speed of the drum beyond a threshold at which it is deformed due to centrifugal force (the so-called "barrel" effect).

A second type of device for optical acquisition of a flat scene comprises a plate movable parallel to an X-X' axis, above which is a fixed rail guiding a carriage that moves parallel to a Y-Y' axis, the X-X' and Y-Y' axes being mutually perpendicular. The scene to be acquired is attached to the plate. The carriage carries an optical acquisition system comprising a sensor, an objective lens whereby the sensor is focused on the scene and a light source for illuminating the part of the scene read by the sensor. The sensors used are routinely of the charge-coupled device (CCD) linear type (meaning that they are made up of photo-sensitive elements disposed along a single line), or matrix type (meaning that they are made up of photo-sensitive elements disposed in m rows and n columns). Linear sensors have the advantage over matrix sensors of being less costly and of enabling the scene to be scanned at constant speed. Devices of this second type, and in particular those comprising a linear sensor, have a very high acquisition rate (in the order of 20 MHz) and can read with great fidelity all types of documents, including those on a rigid medium (glass, for example). It is obvious that this speed and this fidelity result from the use of mechanical systems (for guiding and driving the plate and the carriage, for example) and optical systems (objective lens, etc) which are both very accurate and very highly specified in terms of performance, and which are consequently extremely costly. These devices have the further disadvantage of being relatively bulky and of requiring numerous and frequent adjustments.

An object of the present invention is to provide apparatus for reading optically documents on a transparent medium which has an acquisition rate. comparable with that of existing linear sensor devices but which is compact, of relatively simple construction, very much less costly than prior art devices, requires absolutely no adjustment in use and offers extremely precise magnification.

SUMMARY OF THE INVENTION

The present invention consists in apparatus for reading optically a scene made up of symbols on a transparent medium, comprising:
- a transparent flat plate adapted to support a scene,
- an illumination system on one side of said plate adapted to illuminate at least part of said scene,
- an optical reader device on the opposite side of said plate, including:
  - an optical sensor, and
  - a pneumatic skid adapted to be moved over said opposite side of said plate and having a recess in its surface facing said plate adapted to accomodate said sensor,
- a drive system adapted to move said optical reader device in a plane parallel to said plate In accordance with one feature of the invention said optical reader device has a constant magnification factor of unity.

Other characteristics and advantages of the present invention will emerge more clearly from the following description given by way of example only and with reference to the accompanying drawing, which shows a partial schematic cross-section through the optical reading apparatus in accordance with the invention.

DESCRIPTION OF THE PREFERRED EMBODIMENT

The optical reading apparatus shown in the figure comprises a bed 1 in the form of a parallelepipedal box the top plate 2 of which is transparent and serves to support a document 3 that is to be read. The document 3 is held against the transparent plate 2 by a thin transparent panel 4 which adheres to the plate 2 because of a reduction in pressure brought about between said plate and said panel. The bed 1 is movable parallel to an axis X-X'. A rail 5 passes over it and serves to guide a carriage 6 movable parallel to an axis Y-Y' perpendicular to the axis X-X'. The carriage 6 constitutes a drive system for an optical reader head 7 to which it is linked by an arm 8. The read head 7 essentially comprises a pneumatic skid 9 and a sensor 10 which is advantageously of the linear or matrix CCD type. The pneumatic skid 9 comprises a block of metal, of cylindrical shape, for example, the bearing surface of which is perfectly flat. The skid 9 comprises a series of passages 11 opening onto the edge of its bearing surface and serving as compressed air conduits. It further comprises a recess 12 opening onto its bearing surface and adapted to accommodate the sensor 10. The arm 8 does not couple the read head 7 to the carriage 6 in a rigid way. It comprises a pivot 13 situated either at the skid 9 (as shown in the figure) or alternatively at the carriage 6 and enabling slight modification of the attitude of the skid 9 relative to the plate 4. It further comprises spring means, schematically represented in the diagram by a spring 14, which press on the skid 9 and are rated to equilibrate the upward thrust imparted to it by the compressed air. The advantage of this system is that it is self-adjusting. Provided that the outlets from the passages 11 situated on the bearing surface of the skid 7 are regularly distributed, the distance separating said surface from the panel 4 remains constant (in the order of a few microns). Also, movement of the read head 7 over the bed 1 is totally friction-free.

It will be understood that the provision of the panel 4 is not mandatory. In an alternative embodiment the head 7 could be moved directly over the document 3 by virtue of the lack of contact between them procured by the air film.

It will be understood that in this alternative embodiment the pivot 13 would make it possible to allow for any localized undulations in the document 3.

The presence of the skid 9 in contact with the bed prevents illumination of the part of the document 3 read by the sensor 10 from above. As is done in some prior art linear or matrix sensor devices, provision is made for illuminating this area from below, the top plate 2 of the bed 1 being transparent to this end. An illumination system 20 is therefore housed within the box formed by the bed 1.

In a preferred embodiment of the invention, as shown in the figure, the illumination system 20 is mobile. Its movement is slaved to that of the read head 7 relative to the bed. The illumination system 20 comprises a light source 15, a mirror 17 reflecting light from the light source 15 towards the plate 2 and a convex lens 16 focussing the light from the light source 15 onto the mirror 17. The light source 15 and the lens 16 are preferably fixed while the mirror 17 is preferably mobile relative to the bed 1. The illumination system 20 is advantageously of the type projecting a substantially parallel light beam F towards the scene 3. The advantage of this arrangement is that the image as perceived by the sensor consists in the shadows of the signs on the document. It will be understood that a divergent beam would degrade the accuracy of the image by virtue of the distance between the document 3 and the sensor 10.

An advantageous method for achieving this result consists in placing the light source 15 substantially at the focal point of the lens 16.

An alternative embodiment of the illumination system (not shown) might consist in employing a fixed illumination system projecting a substantially homogeneous beam of light parallel to the axis of displacement Y-Y' of the optical reader device 7. This could be achieved by using one or more fixed fluorescent tubes disposed parallel to the displacement axis Y-Y' beneath the transparent plate 2.

The sensor 10 is fixed into the recess 12 on the skid 9 in such a way that it is sufficiently close to the scene 3 (at a distance on the order to 1 to 2 millimeters) for the divergence of the light beam to be less than the dimensions of a photo-sensitive element (pixel) of said sensor. Linear CCD sensors currently available on the market are made up of substantially square pixels with a side length of about 13 microns. CCD sensors are implemented in CMOS technology. The manufacturing accuracy for their pixels is very high. As the magnification of the optical system is unity, by virtue of its inherent design features, it will be understood that one advantage of the system is to provide an extremely high accuracy of magnification.

The optical reading apparatus that has just been described has numerous advantages, which include:
a very high acquisition rate (better than 20 MHz),
enhanced simplicity of use as compared with prior art implementations, due in particular to the reduced number of adjustments needed in use,
simplicity of design resulting in an economy of means (in particular, the apparatus does not comprise any objective lens for focussing the sensor onto the scene),
an absolutely constant unity magnification,
reduced overall dimensions,
modest manufacturing cost due to its simple design.

It will be understood that various changes in the details, materials and arrangement of parts which have been herein described and illustrated in order to explain the nature of the invention may be made by those skilled in the art within the principle and scope of the invention as expressed in the appended claims.

In particular, the movement of the read head 7 relative to the plate 2 may be controlled by means other than those described: the read head 7 could be fixed, for example, and the bed 1 movable along two mutually perpendicular axes, or the carriage 6 could be movable along two mutually perpendicular axes and the bed 1 fixed. Also, although the orientation of the apparatus in accordance with the invention as described and as shown in the drawing is relative to vertical and horizontal axes, it will be obvious that the apparatus can occupy any position in space.

We claim:

1. Apparatus for reading optically a scene made up of symbols on a transparent medium, said apparatus comprising:
   a transport flat plate adapted to support a scene,
   an illumination system on one side of said plate adapted to project a substantially parallel light beam (F) toward said scene so as to illuminate at least part of said scene,
   an optical reader device on the opposite side of said plate, said optical reader device including:
   an optical sensor, and
   a pneumatic skid adapted to slide on said plate, said skid having a recess in its surface facing said plate, said sensor being housed in said recess such that said sensor faces said scene without any intervening objective lens,
   a drive system adapted to move said optical reader device in a plane parallel to said plate.

2. Apparatus according to claim 1, wherein said optical reader device has a constant magnification factor of unity.

3. Apparatus according to claim 1, wherein said sensor is a linear charge-coupled to device type sensor.

4. Apparatus according to claim 1, wherein said sensor is a matrix charge-coupled device type sensor.

5. Apparatus according to claim 1, wherein said illumination system comprises a light source, a mirror adapted to reflect light from said light source towards said plate and a convex lens adapted to focus light from said light source onto said mirror, wherein said light source and said lens are fixed relative to said plate and wherein and said mirror is movable relative to said plate and slaved to movement of said optical reader device.

6. Apparatus according to claim 1, wherein said illumination system comprises a light source, a mirror adapted to reflect light from said light source towards said plate and a lens adapted to focus light from said light source onto said mirror, said light source and said lens are fixed relative to said plate and said mirror is movable relative to said plate and slaved to movement of said optical reader device, and said light source is substantially at the focal point of said lens.

7. Apparatus according to claim 1, further comprising an arm adapted to couple said skid to said drive system, a pivot in said arm adapted to enable correction of the attitude of said skid and spring means on said arm for equilibrating the pneumatic thrust exerted on the surface of said skid facing said plate.

8. Apparatus according to claim 1, further comprising scene holding means including a transparent panel adapted to be laid over said scene, whereby said scene is sandwiched between said plate and said panel, and wherein said skid is adapted to be moved over said panel.

* * * * *